(12) United States Patent
Lee

(10) Patent No.: US 12,103,754 B2
(45) Date of Patent: Oct. 1, 2024

(54) POWDER STORAGE CONTAINER
(71) Applicant: Jae Ho Lee, Busan (KR)
(72) Inventor: Jae Ho Lee, Busan (KR)
(*) Notice: Subject to any disclaimer, the term of this patent is extended or adjusted under 35 U.S.C. 154(b) by 186 days.
(21) Appl. No.: 17/765,436
(22) PCT Filed: Jan. 26, 2021
(86) PCT No.: PCT/KR2021/001037
§ 371 (c)(1),
(2) Date: Mar. 30, 2022
(87) PCT Pub. No.: WO2021/221271
PCT Pub. Date: Nov. 4, 2021
(65) Prior Publication Data
US 2022/0355995 A1    Nov. 10, 2022
(30) Foreign Application Priority Data

Apr. 28, 2020 (KR) .................. 10-2020-0051315

(51) Int. Cl.
*B65D 77/24* (2006.01)
*B65D 83/06* (2006.01)
*G01F 19/00* (2006.01)
(52) U.S. Cl.
CPC .......... *B65D 77/245* (2013.01); *B65D 83/06* (2013.01); *G01F 19/002* (2013.01)
(58) Field of Classification Search
CPC ...... B65D 77/245; B65D 83/06; G01F 19/002
See application file for complete search history.

(56) References Cited

U.S. PATENT DOCUMENTS 2,310,113 A * 2/1943 Plochman ............... A47J 47/02
215/45
2,738,900 A * 3/1956 Wenger ................ B65D 51/246
215/DIG. 5

(Continued)

FOREIGN PATENT DOCUMENTS

CN    206704865 U    12/2017
JP      3099124 U     3/2004
(Continued)

OTHER PUBLICATIONS

PCT International Search Report for PCT/KR2021/001037 mailed on Jul. 23, 2021 (including translation), 5 pages.

(Continued)

*Primary Examiner* — Jacob K Ackun
(74) *Attorney, Agent, or Firm* — Lewis Roca Rothgerber Christie LLP

(57) ABSTRACT

The present invention relates to a powder storage container formed by comprising: a storage part (10) in which a protein supplement is stored; an opening (20) which is open and connected to the top of the storage part and protrudes upward, and has a screw thread formed on the protruding outer circumferential surface thereof; a lid (30) for opening and closing the opening; a scoop (40) which is formed to be separate from the storage part (10) and is used when scooping the stored protein supplement; and an attaching part (50) which is formed between the upper end of the storage part (10) and the lower end of the opening (20) and enables the scoop (40) and the lid (30) to be attached thereto or detached therefrom and securely placed thereon, wherein the powder storage container of the present invention can improve the problems of uncleanliness in terms of hygiene and worry about loss, as the lid is not placed on the ground but securely placed on the exterior of the container, and the container has the significant effect of being more convenient to use, as an accurate amount by the spoonful can be scooped easily.

4 Claims, 2 Drawing Sheets

(56) References Cited

U.S. PATENT DOCUMENTS

| | | | | |
|---|---|---|---|---|
| 8,302,805 B2 * | 11/2012 | Blomdahl | ............ | B65D 51/247 |
| | | | | 215/390 |
| 8,313,001 B1 * | 11/2012 | Reid | ...................... | B65D 51/20 |
| | | | | 220/256.1 |
| 2008/0142466 A1 * | 6/2008 | Balitski | .................. | B65D 23/12 |
| | | | | 215/6 |
| 2009/0134112 A1 * | 5/2009 | Reeves | .................. | B65D 55/16 |
| | | | | 215/11.1 |
| 2009/0152231 A1 * | 6/2009 | Hanson | .................. | B65D 55/16 |
| | | | | 220/379 |
| 2014/0138341 A1 * | 5/2014 | Dopps | .................... | B65D 47/36 |
| | | | | 215/316 |
| 2014/0299567 A1 * | 10/2014 | Vogel | .................... | B65D 23/12 |
| | | | | 53/421 |
| 2017/0225832 A1 | 8/2017 | Haverland | | |

FOREIGN PATENT DOCUMENTS

| | | |
|---|---|---|
| JP | 2005035585 A | 2/2005 |
| WO | 2013026019 A1 | 2/2013 |

OTHER PUBLICATIONS

PCT Written Opinion for PCT/KR2021/001037 mailed on Jul. 23, 2021, 4 pages.

* cited by examiner

[Fig. 1]
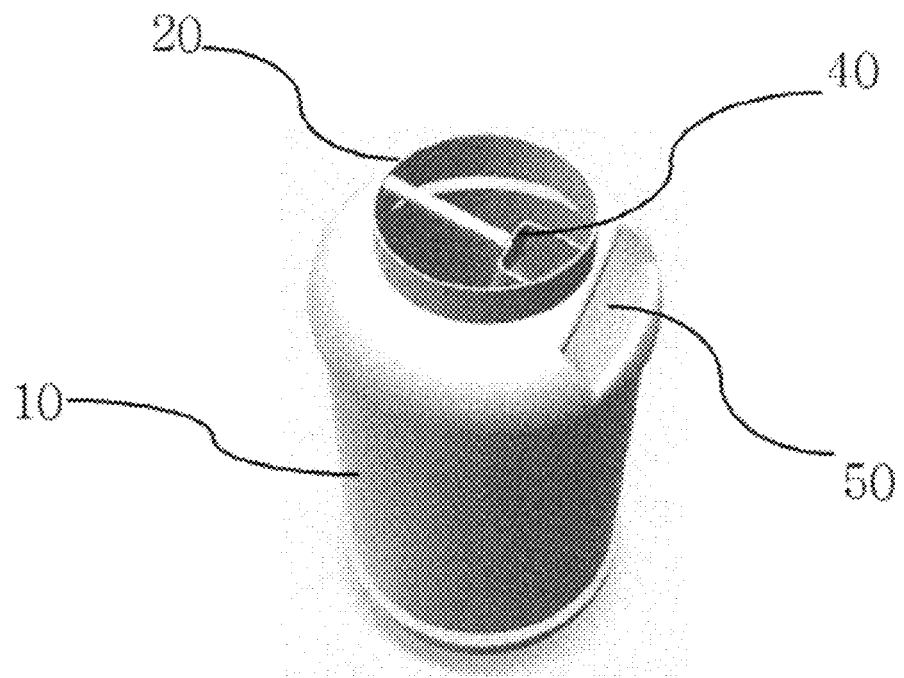
[Fig. 2]
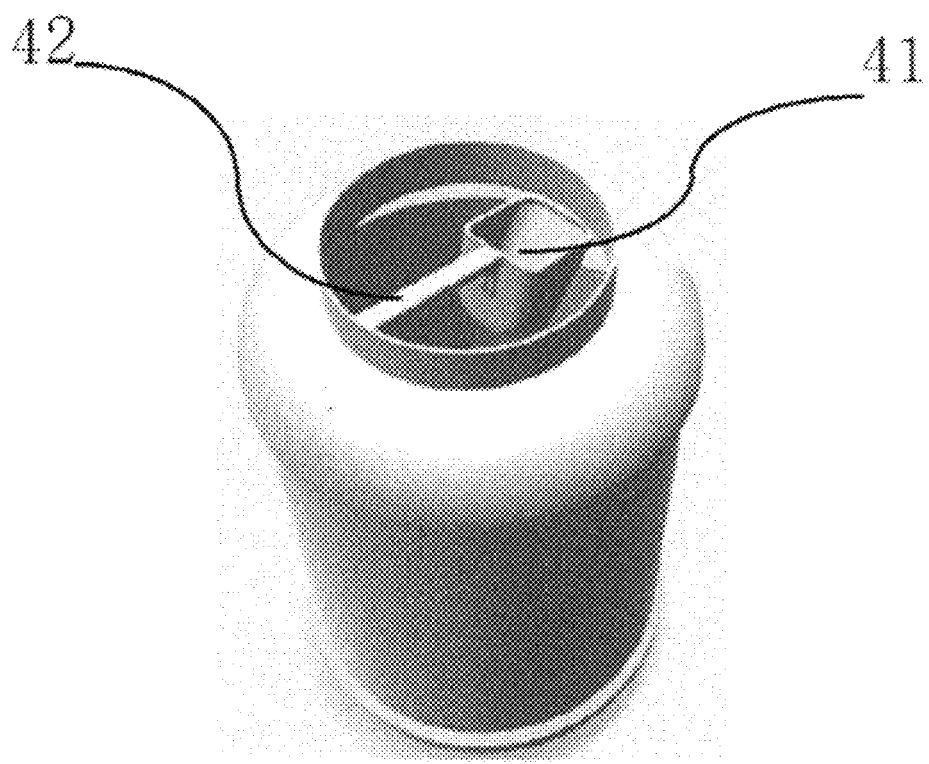

[Fig. 3]
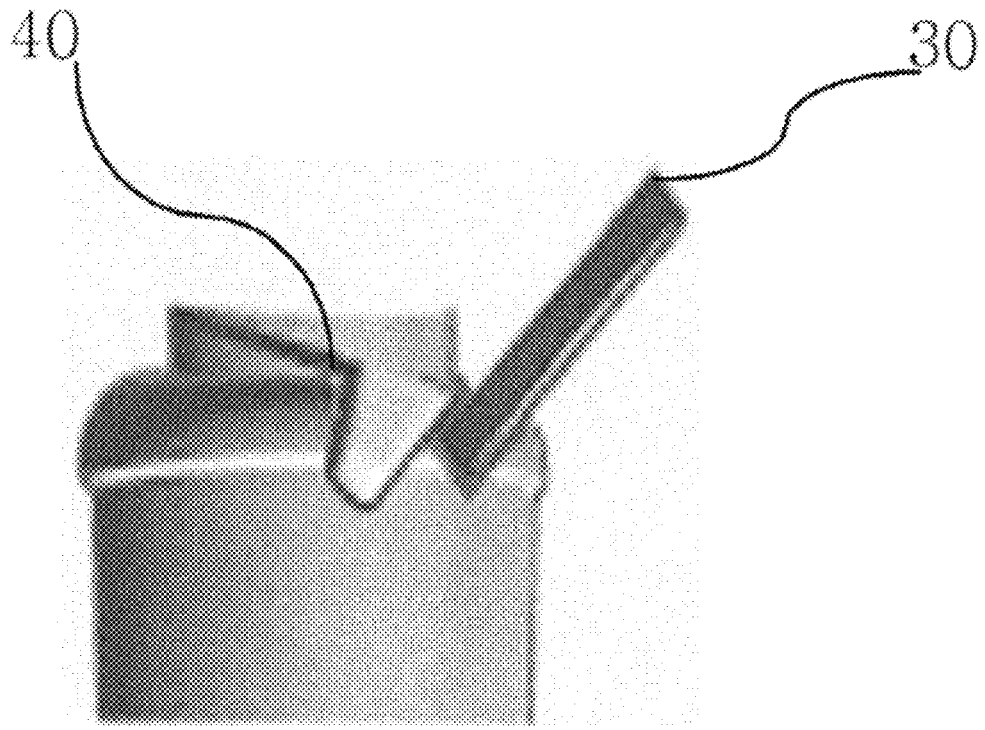
[Fig. 4]
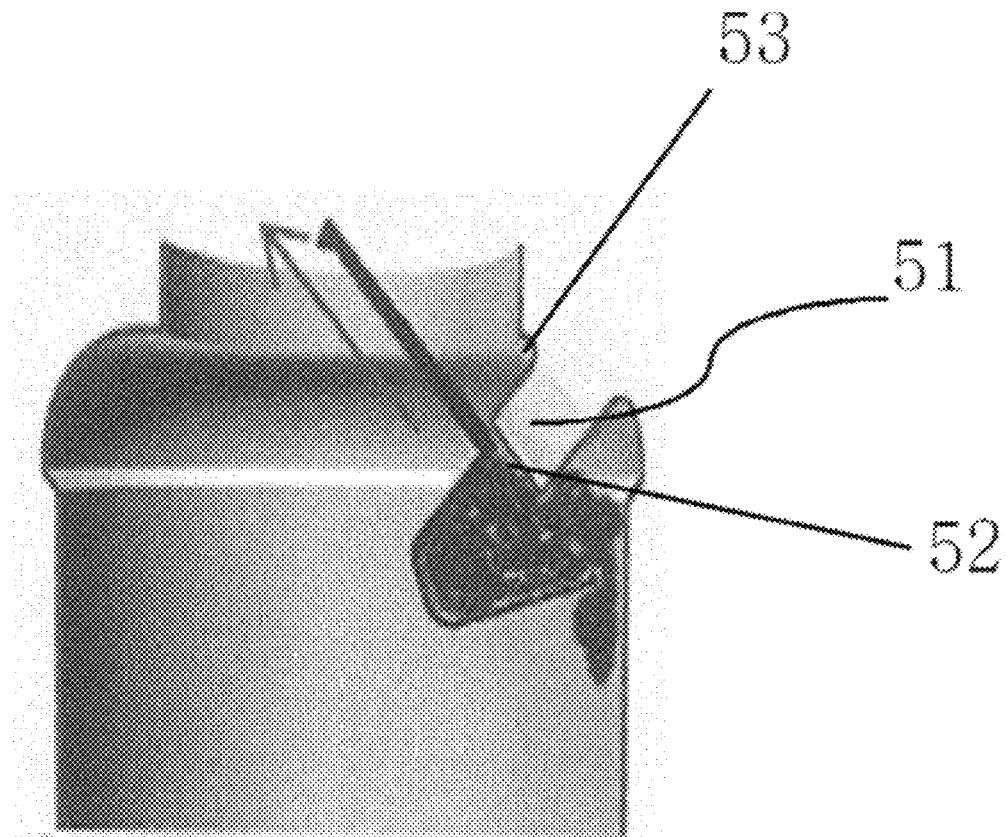

POWDER STORAGE CONTAINER

CROSS-REFERENCE TO RELATED APPLICATIONS

This application is a U.S. National Phase entry under 35 U.S.C. 371 and claims priority to International Patent Application No. PCT/KR2021/001037, filed Jan. 26, 2021, which claims priority to Korean Patent Application No. 10-2020-0051315, filed Apr. 28, 2020, the entire disclosures of each of said applications being incorporated herein by reference.

TECHNICAL FIELD

The present invention relates to a container for storing a powder, and more particularly, to a storage container for storing a protein supplement used when ingesting it while storing a powdered protein supplement.

BACKGROUND ART

In general, people who want to increase muscle strength through muscle training basically need to eat adequate food and drink water, but to increase muscle synthesis and improve strength training in a short time, they consume powdered protein or various other supplements.

Containers for storing protein supplements are usually cylindrical, and have an opening at the top, a lid to open and close the opening, and a built-in scoop that can scoop out a measured amount for consumption.

As an example, as a container 10 of an arbitrary size having a lid 20 in the inlet 11, Registration Utility Model Publication No. 20-0337867 discloses a powder container for quantitative withdrawal that is characterized by comprising a supply hole 21 on the upper surface of the lid 20, and an assembled double lid 30 having a discharge hole 33 on the upper surface with an embedded metering mechanism H above the lid 20, wherein the metering mechanism H consists of an internal diaphragm 31 having a connection hole 32 at a position coinciding with the supply hole 21, and a metering member 40 wherein it moves by a button 42 inside the inner diaphragm 31, and returns by an elastic spring 43 on the opposite side, such that a measuring space 41 is made to coincide with the connection hole 32 and the discharge hole 33.

In addition, Registration Utility Model Publication No. 20-03089492 discloses a lid for a powder container comprising a lower stopper removably fixed so that a powder outlet hole communicates with the outlet of the powder container, and an upper stopper that is rotatably fixed to the lower stopper by a hinge and has a protrusion which can be inserted into the powder outlet hole at a position corresponding to the powder outlet hole on a surface opposite to the lower stopper, characterized in that it further comprises a first annular protrusion extending to surround the powder outlet hole at a constant height on the side of the lower stopper opposite to the upper stopper, and that an accommodation part is formed on the side of the upper stopper opposite to the lower stopper by excluding except for the protrusion such that the inner circumferential surface corresponding to the outer circumferential surface of the first annular protrusion becomes deeper than the height of the first annular protrusion.

However, when you open the lid to take protein supplements while exercising outdoors and use a scoop to take a measured amount, there is a risk of its loss because there is no suitable place to put the lid, and sanitary problems may occur if placed on the floor. In addition, it is impossible to scoop out exactly a measured amount of a spoon for ingestion, and it is inconvenient to store the scoop thereafter.

DETAILED DESCRIPTION OF THE INVENTION

Problem to Be Solved

The present invention was invented to solve the above problems, and it is designed to provide a powder storage container having a structure according to which a lid can be securely placed in the process of taking out the powdered supplement to eat, thereby eliminating the risk of its loss, and the scoop can be attached and detached while it can be placed inside the storage container, and a structure that enables to scoop out an accurately measured amount of the supplement.

Means to Solve the Problem

The present invention relates to a powder storage container, characterized by comprising a storage part 10 storing a protein supplement; an opening 20 connected to the upper part of the storage part and opened while protruding upward, and having a thread formed on a protruding outer circumferential surface thereof; a lid 30 for opening and closing the opening; a scoop 40 formed to be separate from the storage part 10 and used to scoop out a stored protein supplement; and an attaching part 50 formed between the upper end of the storage part 10 and the lower end of the opening 20 and enables the scoop and the lid 30 to be attached or detached and securely placed.

Effects of the Invention

Therefore, according to the powder storage container of the present invention, the lid can be securely placed on an exterior of the container without being placed on the floor, so that it can improve the problem of loss and hygiene, and it can improve convenience in use because an accurate amount by the spoonful can be scooped out easily.

BRIEF DESCRIPTION OF THE DRAWINGS

FIG. 1 is a perspective view of a powder storage container according to the present invention;

FIG. 2 is a perspective view of the powder storage container according to the present invention with a scoop attached;

FIG. 3 is a cross-sectional perspective view of the lid and scoop of the powder storage container according to the present invention;

FIG. 4 is a cross-sectional perspective view of the scoop and measuring surface of the powder storage container according to the present invention;

EXPLANATION OF REFERENCE NUMERALS FOR MAIN PARTS OF THE DRAWING

10: storage part 20: opening
30: lid 40: scoop
41: scoop head 42: scoop handle
50: attaching part 51: groove for placing a lid
52: measuring surface 53: groove for attaching a scoop

BEST MODE TO CARRY OUT THE INVENTION

The present invention relates to a powder storage container, comprising: a storage part 10 storing a protein supplement; an opening 20 connected to an upper part of the storage part and opened while protruding upward, and having a thread formed on a protruding outer circumferential surface thereof; a lid 30 opening and closing the opening; a scoop 40 formed to be separate from the storage part 10 and used to scoop a stored protein supplement; and an attaching part 50 formed between the upper end of the storage part 10 and the lower end of the opening 20 and enabling the scoop and the lid 30 to be attached or detached and securely placed.

In addition, the scoop 40 enters and exits through the opening 20 and thus is used to scoop a measured amount to take out a protein supplement stored in the storage part 10 to eat, and is formed of a scoop head 41 provided with a space for scooping the supplement and a scoop handle 42 extending from the scoop head.

In addition, the storage part 10 is a space for storing protein supplements, wherein a lower part thereof is sealed, an upper part thereof is connected to the opening 20, and an upper side surface thereof is connected to the attaching part 50.

The present invention will be described in detail with reference to the accompanying drawings as follows.

FIG. 1 is a perspective view of a powder storage container according to the present invention; FIG. 2 is a perspective view of the powder storage container according to the present invention with a scoop attached; FIG. 3 is a cross-sectional perspective view of the lid and scoop of the powder storage container according to the present invention; and FIG. 4 is a cross-sectional perspective view of the scoop and measuring surface of the powder storage container according to the present invention.

As shown, the powder storage container of the present invention comprises a storage part 10 for storing protein supplements; an opening 20 connected to an upper part of the storage part and opened while protruding upward, and having a thread formed on a protruding outer circumferential surface thereof; a lid 30 coupled to the opening with the thread to open and close the opening; a scoop 40 formed to be separate from the storage part 10 and used to scoop a stored protein supplement; and an attaching part 50 formed between the upper end of the storage part 10 and the lower end of the opening 20 and enabling the scoop and the lid 30 to be attached or detached and securely placed The storage part 10 is a space for storing protein supplements, wherein a lower part thereof is sealed, an upper part thereof is connected to the opening 20, and an upper side surface thereof is connected to the attaching part 50.

The opening 20 is connected to an upper part of the storage part 10 and opened while protruding upward, and has a thread formed on a protruding outer circumferential surface thereof. Therefore, it becomes the entrance of the storage part 10 for storing protein supplements, and is the place where the scoop 40 enters and exits when protein supplement is scooped out for consumption.

The lid 30 has a thread formed on the inner circumferential surface, and combines with the thread formed on the outer circumferential surface of the opening 20 to open and close the storage container for storing protein supplement.

The scoop 40 enters and exits through the opening 20 and thus is used to scoop a measured amount to take out a protein supplement stored in the storage part 10 to eat, and is formed of a scoop head 41 provided with a space for scooping the supplement and a scoop handle 42 extending from the scoop head. And after the end of the scoop head 41 is inserted into a groove 53 for attaching a scoop, the end of the scoop handle 42 comes into close contact with the inner surface of the opening 20 to attach the scoop.

The attaching part 50, which is formed between the upper end of the storage part 10 and the lower end of the opening 20 and enables the scoop and the lid 30 to be attached or detached and securely placed, is characterized by comprising a groove 51 for placing a lid in which the lid can be securely placed; a measuring surface 52 formed on an inner upper part of the storage part 10; and a groove 53 for attaching a scoop formed on an inner surface between the lower end of the opening 20 and the upper end of the groove 51 for placing the lid.

The groove 51 for placing the lid formed on an upper outer side surface of the storage part 10 is inclined in the direction of the central axis of the storage part, and is formed depressed in the shape of a square box, wherein the depth of the depression is set such that once placed on it, the lid 30 may not be detached due to a gravity or external impact, and its width is larger than the thickness of the lid so that after the lid is opened, it can be comfortably inserted and securely placed, and the bottom of the groove is formed at a right angle to a depressed side. Therefore, in an upper part of the storage part 10, a protrusion in the form of a rectangular column inclined in the downward direction is formed due to the groove 51 for placing the lid, and the measuring surface 52 in the form of an inclined rectangle is formed at a lower end of the protrusion, wherein the measuring surface 52 can be used to scrape off the protein supplement piled up high in the scoop to make it level, so as to scoop out an exact measurement one scoop at a time.

In addition, the groove 53 for attaching a scoop is horizontally formed on an inner surface between the lower end of the opening 20 and the upper end of the groove 51 for placing the lid, wherein the length of the groove is longer than the end of the scoop head 41, and the size is equal to the thickness of the end of the scoop, thereby making it detachable. Therefore, when the end of the scoop head 41 is inserted into the groove 53 for attaching a scoop and then, the end of the scoop handle 42 is brought into close contact with the inner surface of the opening, the scoop 40 is fixed.

The method of using the powder storage container of the present invention according to an embodiment is as follows.

First, the lid 30 is opened, and then the scoop 40 is removed using the scoop handle 42. Then, a big spoonful of protein supplement stored in the storage unit 10 is taken out with it piling up high in the scoop head 41 and then it is scraped off to be made level by the head of the scoop moving along against the measuring surface 52 to measure an exact amount of one spoon. After ingesting the protein supplement, the end of the scoop head is inserted into the groove 53 for attaching a scoop and the end of the scoop handle is closely attached to the inner surface of the opening to fix the scoop. Then close the lid and store it.

The invention claimed is:

1. A storage container comprising:
a storage part configured to store powder;
an opening connected to one end of the storage part;
a lid configured to open or close the opening;
a scoop configured to scoop a measured amount of the powder stored in the storage part, the scoop comprising, a scoop head provided with a cavity for scooping the powder and a scoop handle extending from the scoop head; and an attaching part configured to receive the lid when the lid is not used to close the opening, the attaching part comprising, a first groove in a shape configured to mate with the lid, wherein the lid is securely attached to the first groove from a location outside the opening when the lid is mated with the first groove;

a measuring surface formed on a bottom side of the first groove and configured to be used to scrape off the powder in an amount that exceeds the cavity so as to scoop out the measured amount of powder in each scoop; and a second groove formed on an inner surface of the container between a lower end of the opening and an upper end of the first groove, the second groove is configured to receive a portion of the scoop head when the scoop is placed inside of the container such that the scoop is securely placed inside of the container.

2. The storage container of claim 1, wherein the first groove is configured to be inclined toward a central axis of the storage part and depressed in a shape that corresponds to a shape of the lid, allowing the lid to be securely placed on the attaching part when the lid is mated with the first groove without being detached due to gravity.

3. The storage container of claim 1, wherein the measuring surface is formed in a shape of a rectangle.

4. The storage container of claim 1, wherein the scoop is removably received in the second groove.

* * * * *